(12) United States Patent
Corrales

(10) Patent No.: US 9,962,596 B2
(45) Date of Patent: May 8, 2018

(54) SELF-STANDING SKATEBOARD SYSTEM

(71) Applicant: Alcides Corrales, Cape Coral, FL (US)

(72) Inventor: Alcides Corrales, Cape Coral, FL (US)

(*) Notice: Subject to any disclaimer, the term of this patent is extended or adjusted under 35 U.S.C. 154(b) by 0 days. days.

(21) Appl. No.: 15/814,056

(22) Filed: Nov. 15, 2017

(65) Prior Publication Data

US 2018/0071613 A1  Mar. 15, 2018

Related U.S. Application Data

(63) Continuation of application No. 14/337,617, filed on Jul. 22, 2014, now abandoned.

(51) Int. Cl.
| | | |
|---|---|---|
| *A63C 17/00* | (2006.01) | |
| *A63C 17/01* | (2006.01) | |
| *A63C 11/02* | (2006.01) | |
| *A63C 3/00* | (2006.01) | |

(52) U.S. Cl.
CPC ...... *A63C 17/0013* (2013.01); *A63C 17/0006* (2013.01); *A63C 17/01* (2013.01); *A63C 3/00* (2013.01); *A63C 11/028* (2013.01); *A63C 17/00* (2013.01); *A63C 17/012* (2013.01); *A63C 17/015* (2013.01); *A63C 2203/44* (2013.01); *F16M 2200/08* (2013.01)

(58) Field of Classification Search
CPC ........ A01K 97/10; F16M 11/00; F16M 13/00; F16M 11/38; F16M 11/10; F16M 2200/08; E04H 12/2215; E04H 12/2238; G09F 1/06; A47F 5/112; A47F 5/00; A63C 17/00; A63C 17/0006; A63C 17/0013; A63C 17/002; A63C 11/028; A63C 17/01; A63C 17/012; A63C 17/015; A63C 17/26; A63C 3/00; A63B 55/10; A47B 23/044; A47B 23/043; A47B 97/08

USPC ....... 248/459, 472, 463, 150, 166, 520, 528, 248/511, 517, 519, 315.2, 523, 188.6, 248/346.6; 211/64, 85.7; 473/282; D6/682; D21/765, 771

See application file for complete search history.

(56) References Cited

U.S. PATENT DOCUMENTS

| | | | | |
|---|---|---|---|---|
| 4,616,749 A | * | 10/1986 | Briggs | A63B 55/10 206/315.2 |
| 5,120,012 A | * | 6/1992 | Rosenau | A63C 17/00 211/89.01 |
| 5,226,647 A | * | 7/1993 | Notarmuzi | A24F 13/22 15/236.08 |

(Continued)

*Primary Examiner* — Stanton L Krycinski
*Assistant Examiner* — Taylor L Morris
(74) *Attorney, Agent, or Firm* — George F. Wallace

(57) ABSTRACT

A self-standing skateboard system includes a skateboard and a panel. The skateboard includes first and second trucks attached to a deck. The panel includes a front face, a back face, and a perimeter edge extending around and between the front face and the back face, the perimeter edge having a first end opposite a second end and a pair of opposed sides coupled to and extending between the first and second ends, with the panel having a slot extending into the first end defining a pair of spaced projections, and the slot being configured for receiving one of the first and second trucks for supporting the skateboard on the panel. Further, the panel has a notch extending into the second end defining a pair of feet for supporting the panel in an upright position on a supporting surface.

12 Claims, 4 Drawing Sheets

(56) References Cited

U.S. PATENT DOCUMENTS

| | | | | |
|---|---|---|---|---|
| 5,230,507 | A * | 7/1993 | White | A63B 55/10 206/315.3 |
| 5,413,329 | A * | 5/1995 | Hirsch | A63B 55/10 211/70.2 |
| 6,604,639 | B2 * | 8/2003 | Chen | A47F 7/00 211/41.2 |
| 6,640,978 | B2 * | 11/2003 | Reiser | A63C 11/028 211/4 |
| 7,014,052 | B2 * | 3/2006 | Dettorre | A47F 5/0838 211/18 |
| 7,258,320 | B2 * | 8/2007 | Tai | A47B 19/002 248/166 |
| 7,434,771 | B1 * | 10/2008 | Tai | F16L 3/00 138/106 |
| 7,777,110 | B2 * | 8/2010 | Wallis | G10G 5/00 248/443 |
| 8,833,570 | B2 * | 9/2014 | Hoppus | B23P 17/04 211/63 |
| 2004/0118797 | A1 * | 6/2004 | Cormier | A47B 81/00 211/85.7 |
| 2005/0121567 | A1 * | 6/2005 | Meuniot | F16M 13/00 248/150 |
| 2007/0096002 | A1 * | 5/2007 | Knight | A47B 23/043 248/460 |
| 2015/0321686 | A1 * | 11/2015 | Taylor | A45F 3/04 280/47.34 |
| 2017/0037660 | A1 * | 2/2017 | Chesterton | E05B 73/0094 |

* cited by examiner

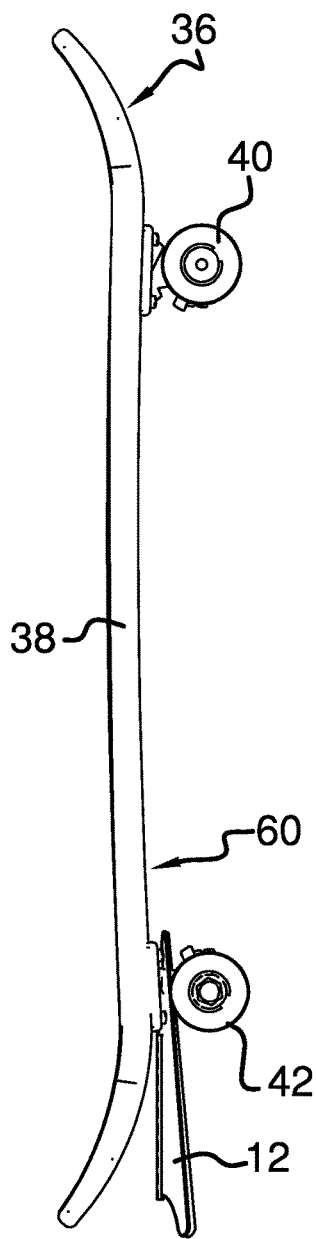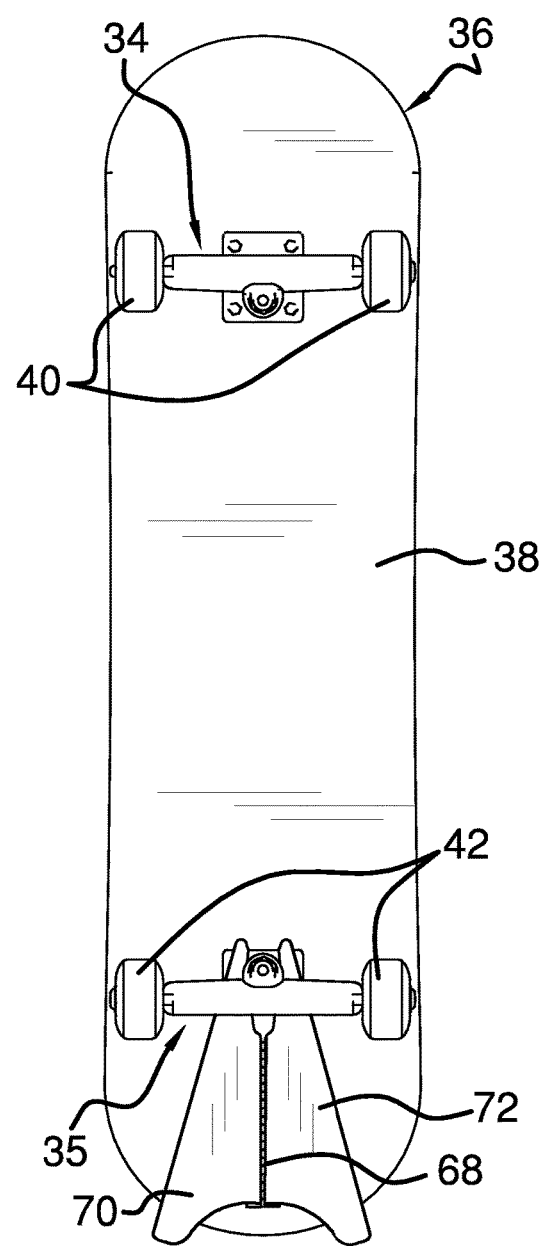
FIG. 4
FIG. 5

SELF-STANDING SKATEBOARD SYSTEM

RELATED DOCUMENTS

This application is related to, incorporates by reference in its entirety, and claims the priority benefit of U.S. patent application Ser. No. 14/337,617, entitled "Support Stand Device," and filed on Jul. 22, 2014 by Alcides Corrales.

FIELD OF THE INVENTION

The present invention relates to skateboards, and more specifically, to a self-standing skateboard system.

BACKGROUND OF THE INVENTION

This disclosure relates to stand devices and more particularly pertains to a self-standing skateboard system that can be desirably stored and displayed.

SUMMARY OF THE INVENTION

An embodiment of the disclosure meets the needs presented above by generally comprising a panel having a front face, a back face and a perimeter edge extending 20 around and between the front face and the back face. The perimeter edge has a first end opposite a second end and a pair of opposed sides coupled to and extending between the first end and the second end. The panel has a slot extending into the first end defining a pair of spaced projections. The slot receives a truck of a skateboard for supporting the skateboard on the panel. The panel has a notch extending into the second end defining a 25 pair of feet for supporting the panel in an upright position on a supporting surface.

There has thus been outlined, rather broadly, the more important features of the disclosure in order that the detailed description thereof that follows may be better understood, and in order that the present contribution to the art may be better appreciated. 30 There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a side view of an embodiment of the disclosure in use.

FIG. 5 is a front view of an embodiment of the disclosure in use.

DETAILED DESCRIPTION

Figure 1:
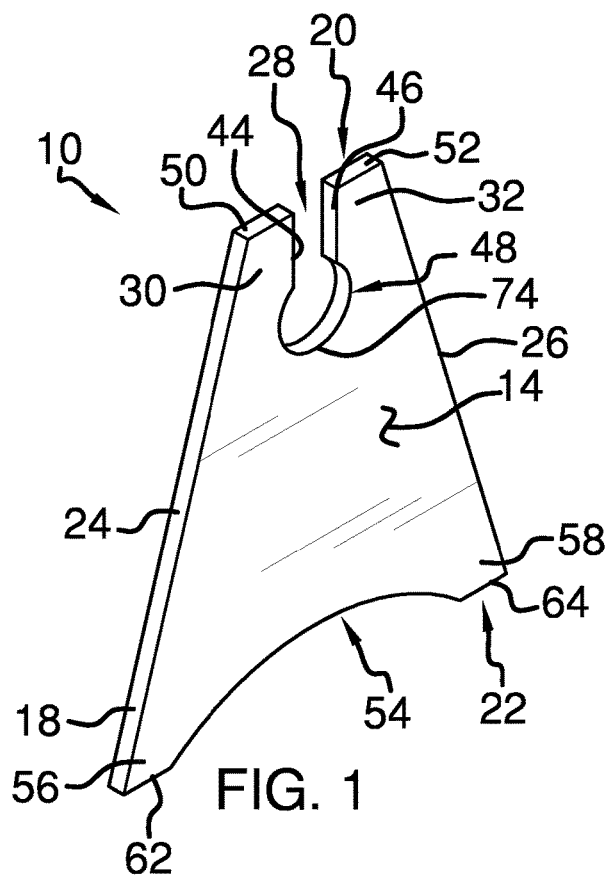
FIG. 1 is a top front side perspective view of a support stand device according to an embodiment of the disclosure.
Figure 2:
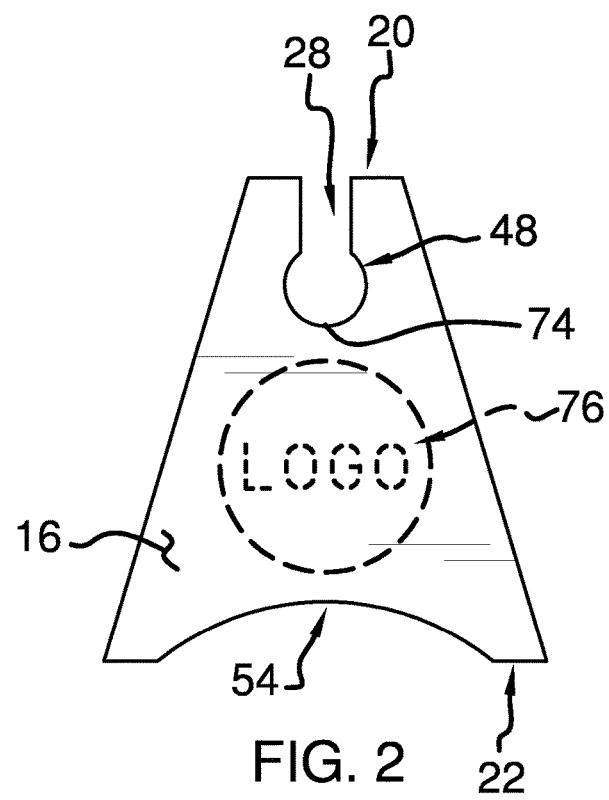
FIG. 2 is a front view of an embodiment of the disclosure.
Figure 3:
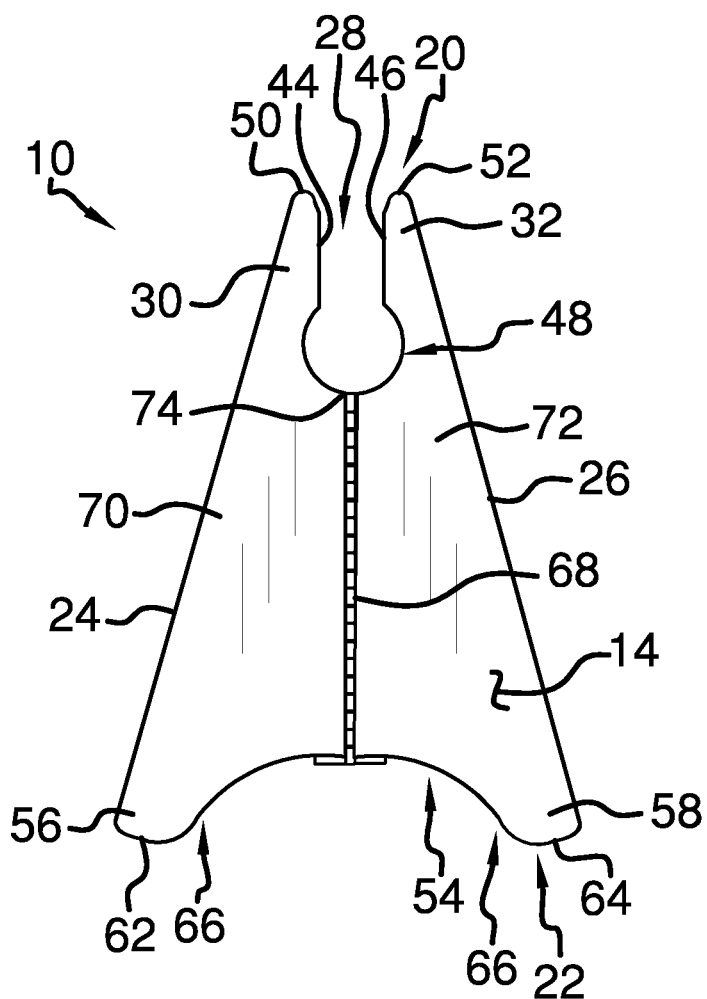
FIG. 3 is a front view of an alternative embodiment of the disclosure.

With reference now to the drawings, and in particular to FIGS. 1 through 6 thereof, a new stand device embodying the principles and concepts of an embodiment of the disclosure and generally designated by the reference numeral 10 will be described.

As best illustrated in FIGS. 1 through 6, the support stand device 10 generally comprises a panel 12 having a front face 14, a back face 16 and a perimeter edge 18 extending around and between the front face 14 and the back face 16. The perimeter edge 18 has a first end 20 opposite a second end 22 and a pair of opposed sides 24, 26 coupled to and extending between the first end 20 and the second end 22. A longitudinal axis extends between the first end 20 and the second end 22 of the panel 12. The panel 12 is comprised of a rigid material, such as metal, plastic, wood or the like. A distance between the first end 20 and the second end 22 may measure between approximately 20.05 cm and 28.0 cm. A distance between the opposed sides 24, 26 at the second end 22 may measure between approximately 15.0 cm and 20.0 cm.

The panel 12 has a slot 28 extending into the first end 20 defining a pair of spaced projections 30, 32. The slot 28 is configured for receiving a selectable truck 34, 35 of a skateboard 36 for supporting the skateboard 36 on the panel 12. The skateboard 36 used can be of any conventional design having a deck 38, a pair of front wheels 40, and a pair of rear wheels 42. The front wheels 40 are coupled to the deck 38 by a front truck 34, while the rear wheels 42 are coupled to the deck 38 by a rear truck 35. Inner edges 44, 46 of each of the projections 30, 32 are elongated and positioned parallel with respect to each other. The panel 12 has an opening 48 extending through the front face 14 and the back face 16. The opening 48 is positioned near the first end 20 of the panel 12. The slot 28 extends from the opening 48 through the perimeter edge 18. The opening 48 may be circular. Each of the projections 30, 32 has a respective top end 50, 52 that may be positioned transversely relative to the longitudinal axis of the panel 12. Alternatively, as shown in FIGS. 3-6, the top end 50, 52 of each of the projections 30, 32 may be rounded.

The panel 12 has a notch 54 extending into the second end 22 defining a pair of feet 56, 58 for supporting the panel 12 in an upright position 60 on a supporting surface. The notch 54 may be concavely arcuate extending between the feet 56, 58. The perimeter edge 18 may taper inwardly from the feet 56, 58 to the first end 20 of the panel 12. Each of the feet 56, 58 has a respective bottom end 62, 64 that may be planar and positioned transversely relative to the longitudinal axis of the panel 12. Alternatively, as shown in FIGS. 3-6, each of the feet 56, 58 may be rounded and may slant upwardly from a juncture 66 of the notch 54 and the associated foot 56, 58 toward an associated one of the opposed sides 24, 26 of the panel 12.

An alternative embodiment of the invention is shown in FIGS. 3-6 that includes a hinge 68 coupled to the panel 12. The hinge 68 defines a first section 70 and a second section 72 of the panel 12 that are hingedly coupled together. The hinge 68 extends along the longitudinal axis of the panel 12 and may be centrally positioned between the opposed sides 24, 26 of the panel 12. The hinge 68 extends from a bottom edge 74 of the opening 48 to the notch 54. The hinge 68 allows the first section 70 and the second section 72 to fold and abut each other for compact storage of the device 10.

Figure 6:
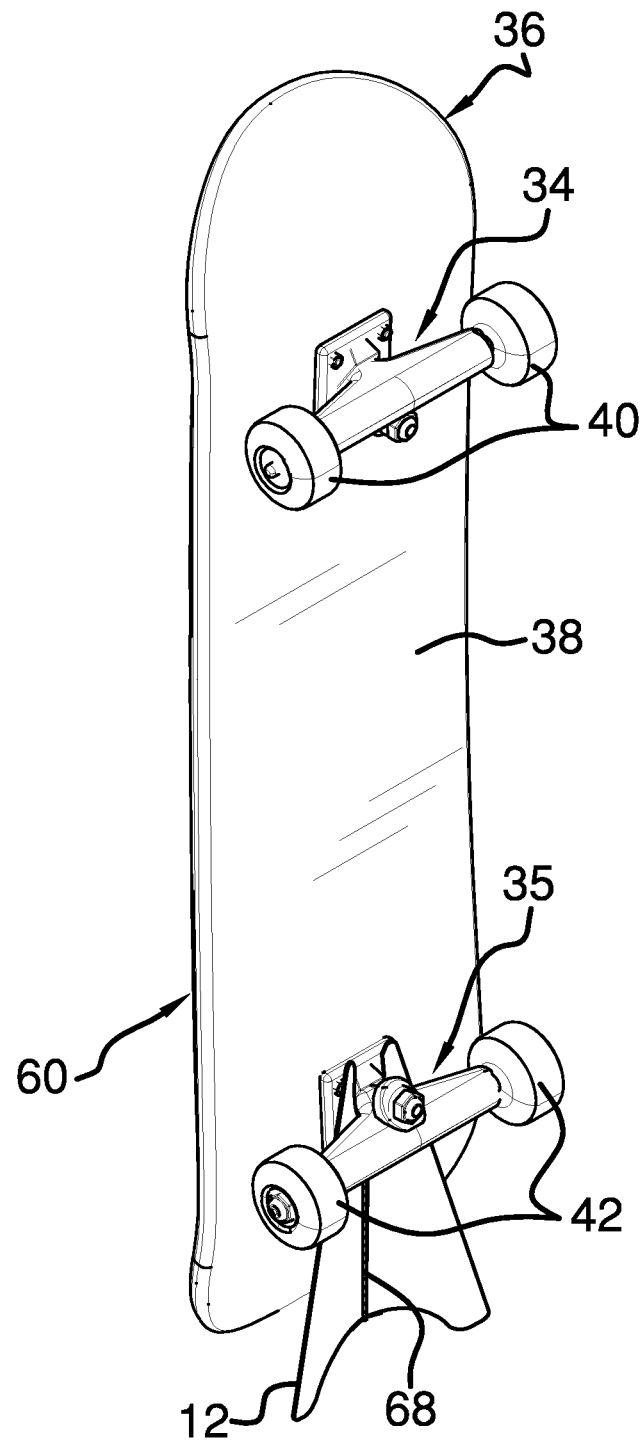
FIG. 6 is a top front side perspective view of an embodiment of the disclosure in use.

In use, the panel 12 is positioned on a support surface, such as a shelf or a floor. A selectable truck 34, 35 of the skateboard 36 is positioned in the slot 28 for supporting the skateboard 36 from the panel 12, as shown in FIGS. 4-6. In this manner, the device 15 10 keeps the skateboard 36 off the support surface for displaying the skateboard 36 or for storing the skateboard 36 above the support surface. Indicia 76, such as a logo, may be positioned on either the front face 14 or the back face 16 of the panel 12.

With respect to the above description then, it is to be realized that the optimum 20 dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and 30 equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

Therefore, I claim:

1. A self-standing skateboard system, comprising:
a skateboard having first and second trucks attached to a deck; and
a panel having a front face, a back face, and a perimeter edge extending around and between said front face and said back face, the perimeter edge having a first end opposite a second end and a pair of opposed sides coupled to and extending between the first and second ends; said panel having a slot extending into the first end defining a pair of spaced projections, the slot being configured for receiving one of the first and second trucks for supporting the skateboard on said panel; and
said panel having a hinge coupled to said panel defining a first section and a second section of said panel hingedly coupled together, and a notch extending into the second end defining a pair of feet for supporting said panel in an upright position on a supporting surface;
wherein when one of the first and second trucks is received by the slot, the first and second sections of said panel are angled by the hinge away from the deck of the skateboard.

2. The system of claim 1, wherein said panel further having an opening extending through said front face and said back face, said opening being positioned near said first end of said panel, said slot extending from said opening through said perimeter edge.

3. The system of claim 2, wherein the opening is circular.

4. The system of claim 1, wherein the notch is, concavely arcuate, and extends between the feet.

5. The system of claim 1, wherein the perimeter edge tapers inwardly from the feet to the first end of said panel.

6. The system of claim 1, wherein each of the projections includes inner edges being elongated and positioned parallel with respect to each other.

7. The system of claim 1, wherein said panel includes a longitudinal axis extending between the first and second ends, and each of the projections have a respective top end being positioned transversely relative to the longitudinal axis of said panel.

8. The system of claim 1, wherein said panel includes a longitudinal axis extending between the first and second ends, and the hinge being centrally positioned between the opposed sides of said panel and extending along the longitudinal axis of said panel.

9. The system of claim 1, wherein each of the projections has a respective top end being rounded.

10. The system of claim 1, wherein each of the feet has a respective bottom end being rounded.

11. The system of claim 1, wherein each of the feet has a respective bottom end slanting upwardly from a juncture of the notch and toward an associated one of the opposed sides of said panel.

12. A self-standing skateboard system, comprising:
a panel having a front face, a back face and a perimeter edge extending around and between said front face and said back face, said perimeter edge having a first end opposite a second end and a pair of opposed sides coupled to and extending between said first end and said second end, a longitudinal axis extending between said first end and said second end of said panel; and
a hinge coupled to said panel defining a first section and a second section of said panel hingedly coupled together, said hinge being centrally positioned between said opposed sides of said panel and extending along said longitudinal axis of said panel;
said panel having a slot extending into said first end defining a pair of spaced projections, said slot being configured for receiving a truck of a skateboard for supporting the skateboard on said panel, inner edges of each of said projections being elongated and positioned parallel with respect to each other;
said panel having an opening extending through said front face and said back face, said opening being positioned near said first end of said panel, said slot extending from said opening through said perimeter edge, said opening being circular; and
said panel having a notch extending into said second end defining a pair of feet for supporting said panel in an upright position on a supporting surface, said notch being concavely arcuate extending between said feet, said perimeter edge tapering inwardly from said feet to said first end of said panel;
with each of said projections having a respective top end being rounded, and each of said feet having a respective bottom end being rounded, each said bottom end slanting upwardly from a juncture of said notch and an associated one of said feet toward an associated one of said opposed sides of said panel;
wherein said hinge extends from a bottom edge of said opening to said notch, and when the truck is received by said slot, the first and second sections of said panel are angled by the hinge away from a deck of the skateboard.

* * * * *